May 7, 1957     M. W. ROSCOE ET AL     2,791,001
COTTON BOLL SEPARATING APPARATUS
Filed March 8, 1952     2 Sheets-Sheet 1

INVENTORS
M. W. Roscoe & J. F. Foster
BY
Attorney

May 7, 1957 M. W. ROSCOE ET AL 2,791,001
COTTON BOLL SEPARATING APPARATUS
Filed March 8, 1952 2 Sheets-Sheet 2
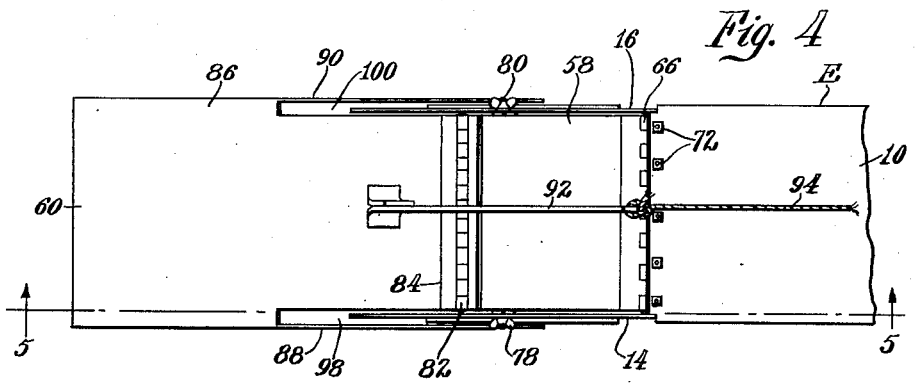
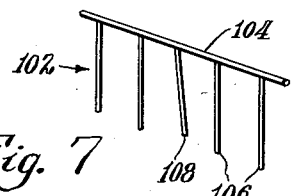
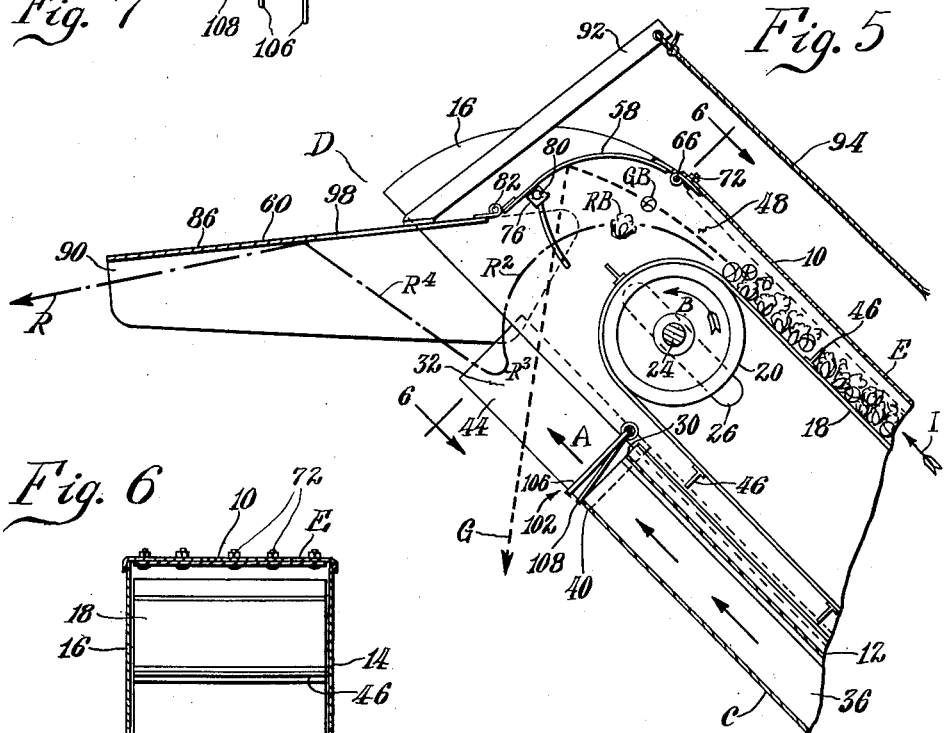
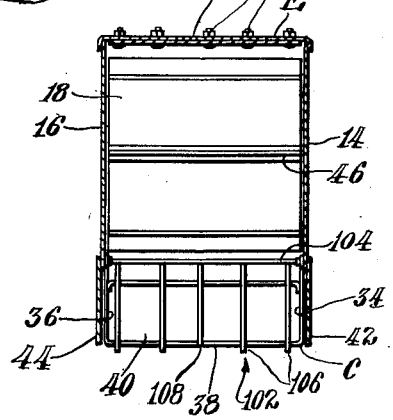
INVENTORS
M. W. Roscoe & J. F. Foster
BY
Attorney

United States Patent Office 2,791,001
Patented May 7, 1957

2,791,001

COTTON BOLL SEPARATING APPARATUS

Merrill W. Roscoe, East Moline, and Jack F. Foster, Moline, Ill., assignors to Deere & Company, Moline, Ill., a corporation of Illinois Application March 8, 1952, Serial No. 275,553

7 Claims. (Cl. 19—72)

This invention relates to apparatus for handling cotton bolls and more particularly to means for separating green bolls from ripe bolls.

There at at present two commercially exploited methods of picking cotton from the field. One of these is the spindle method in which a suitable machine having rotating spindles is operated over a cotton field to pick or pluck the cotton from ripe open bolls on the cotton plant. In this method of harvesting, there is a minimum accumulation of unripe or green bolls, since the picking mechanism is designed to leave the green bolls on the plant for later picking when they have ripened.

The other method is the stripper method in which the cotton harvester is equipped with means providing an elongated slot through which the plants are caused to pass as the harvesting machine travels over the field. In a machine of this type, ripe and green bolls are indiscriminately stripped from the standing plants. Although this method has certain advantages over the spindle method, there is inherent therein the problem of separating the ripe bolls from the green bolls and it is preferred that some sort of preliminary separation be accomplished in the field.

The conventional cotton stripper comprises one or more stripper units mounted on an agricultural tractor behind which is towed a wagon or trailer into which the indiscriminately intermingled ripe and green bolls are discharged by an elevator leading from the stripper unit or units.

Green bolls are relatively heavy and compact as compared with ripe bolls, primarily because their moisture content is higher, whereas the ripe bolls have a lower moisture content and the cottom bursting out of them makes them lighter and fluffier. The differences in weight and size characteristics give rise to important differences in the manner in which the two can be handled. Although it is conceivable that special equipment could be provided for handling the two types of bolls, it must be borne in mind that economy dictates a simple expedient that can be used preferably as a part of the harvesting equipment.

It was formerly conceived that the use of an air blast at the discharge end of the wagon elevator would serve to separate the ripe bolls from the green bolls, the theory being that the air blast would blow the lighter bolls farther rearwardly in the trailing wagon while the heavier green bolls would be unaffected by the air blast and would drop to the forward part of the wagon. But as a practical matter, the system does not operate in this fashion becaus the acceleration of the green bolls as they depart from the upper end of the conveyor substantially equals the acceleration given to the ripe bolls by the air blast, with the result that separation is not accomplished and both types of bolls are intermingled in the wagon or other receptacle.

According to the present invention, proper separation of the green bolls from the ripe bolls is accomplished by equipping the discharge end of the wagon elevator with means for retarding the travel of both types of bolls so that they are caused to drop directly downwardly to be traversed by a blast of air just below the discharge outlet of the conveyor means. The retarding of the green bolls eliminates the problem of acceleration thereof and they will drop straight downwardly without being affected by the air blast, whereas the air blast will blow the lighter bolls to the rear part of the wagon or receptacle. It is an important object of the invention to provide the separating means as an attachment for elevators of existing types. The invention has for a further object the provision of grille structure to prevent bolls from dropping downwardly into the conduit that delivers the air blast. The grille structure is preferably provided as hinged or suspended means that can yield in the direction of the air blast to permit the escape from the conduit of cotton or other objects taken in at the intake of the pneumatic means with which the air outlet is associated.

The foregoing and other important objects and desirable features inherent in and encompassed by the invention will become apparent as a preferred embodiment of the invention is disclosed in the following detailed description and accompanying sheets of drawings in which Figure 1 is a side view of a typical cotton stripper and trailing wagon;

Figure 4 is a plan view of the upper end portion of the elevator with the attachment assembled thereto;

Figure 5 is a sectional view taken on the line 5—5 of Figure 4;

Figure 6 is a transverse sectional view taken on the line 6—6 of Figure 5; and

Figure 7 is a perspective view of the grille structure that is associated with the air conduit.

Figure 1:
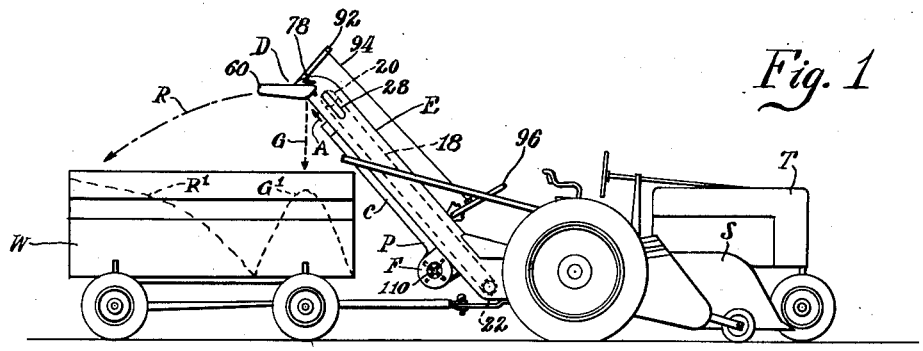

For the purposes of presenting an over-all picture of what is involved, reference will be had to Figure 1. The harvester shown is of the vehicle-mounted type comprising a stripper unit S carried at the right-hand side of a tractor T for stripping cotton from standing plants as the tractor is advanced over the field. A representative stripper harvester of this type is shown in U. S. Patent 2,533,510. The harvester is provided at its rear end with an upwardly inclined elevator E having a discharge end D located over the box of a trailing wagon W. As the harvester progresses over the field, the stripper unit S strips both ripe and green bolls from the plants. These bolls are conveyed rearwardly to the elevator E and, while indiscriminately intermingled, are elevated to the point D for discharge into the wagon W. Omitting for the moment the details of the invention, the result is that the ripe bolls are discharged in a stream or path R and the green bolls drop through a path or stream G.

Pneumatic means P comprising a fan F and an air conduit C directs a blast of air at A to aid in the separation of the green and ripe bolls into the two paths or streams G and R, whereupon the two types of bolls are separated in the wagon W as indicated by the dotted outlines of a ripe boll pile $R^1$ and a green boll pile $G^1$.

The elevator E comprises an elongated housing made up of a top wall 10, a bottom wall 12 and right- and left-hand side walls 14 and 16. The position of the elevator relative to the tractor is one of upward and rearward inclination. The angle of the elevator could, of course, be varied and could even be horizontal if appropriate. In any event, it is the fact that the elevator is arranged at a substantial angle to the vertical that creates the particular separation problem with which the present invention is concerned. Accordingly, the specific angle at which the elevator E is inclined is of no moment and the illustration and description in this respect should not be construed as importing any limitation into the claims appended hereto.

The elevator housing is or may be of conventional trough-like construction and contains therein conveyor means in the form of an endless belt 18 trained at its upper end about a transverse roller 20 that rotates in the direction of the arrow B (Figure 5). The lower end of the conveyor belt may be supported in any suitable manner and may be driven by power derived from the tractor. These details are unimportant and are not illustrated as to specific form. Figure 1 illustrates generally the position of the lower end of the conveyor belt 18 and suggests that a second roller 22 may serve to carry the lower end of the belt.

The upper roller 20 is carried on a shaft 24 which is adjustably positionable lengthwise of the elevator housing to accommodate changes in length of the belt 18. Figure 5 shows that the left-hand side wall 16 may be provided with an elongated slot 26 in which the proximate end of the shaft 24 may be shifted. A similar slot (not shown) may be provided in the right-hand wall 14. Normally, these slots will be covered by appropriate closure means such as illustrated at 28 in Figures 1 and 2.

The bottom wall 12 of the elevator housing or trough is illustrated here as forming the top wall of the air conduit C. The structure may be otherwise than that illustrated, but the details are immaterial. The wall portion 12 terminates at a transverse rear edge 30 short of the terminal rear ends of the side walls 14 and 16, thus providing a downwardly directed, cotton-discharge outlet 32. The conduit C is completed by side walls 34 and 36 and a bottom wall or floor 38. The fan F delivers air through the conduit for discharge at the upper end of the conduit C, which is here designated as an air outlet 40. The direction of the air blast is designated by the arrow A, previously referred to in connection with the description of Figure 1. The direction of the air blast is generally parallel to the direction of movement of the upper run of the conveyor belt 18. Both of these directions are transverse to the vertical.

Side wall extensions or flaps 42 and 44 are provided substantially as continuations of the air conduit side walls to carry these side walls beyond the air outlet 40. These flaps may be secured to either the housing side walls or to the conduit side walls. The distinction is unimportant.

Figure 5 illustrates that the conveyor belt 18 is provided with a plurality of cross slats 46 for conveying the indiscriminately intermingled ripe bolls RB and green bolls GB. The two types of bolls are conveyed upwardly and of course depart from the conveyor belt at the roller 20. Thus, this portion of the conveyor means may be considered a discharge portion, the general zone of which is designated by the numeral 48. Because of the greater kinetic energy of the green bolls GB, they will depart from the conveyor belt 18 more rapidly and farther rearwardly than the ripe bolls RB. This gives rise to the separation problem discussed generally above. According to the present invention, the difficulty is eliminated and proper separation is accomplished.

Figure 2:
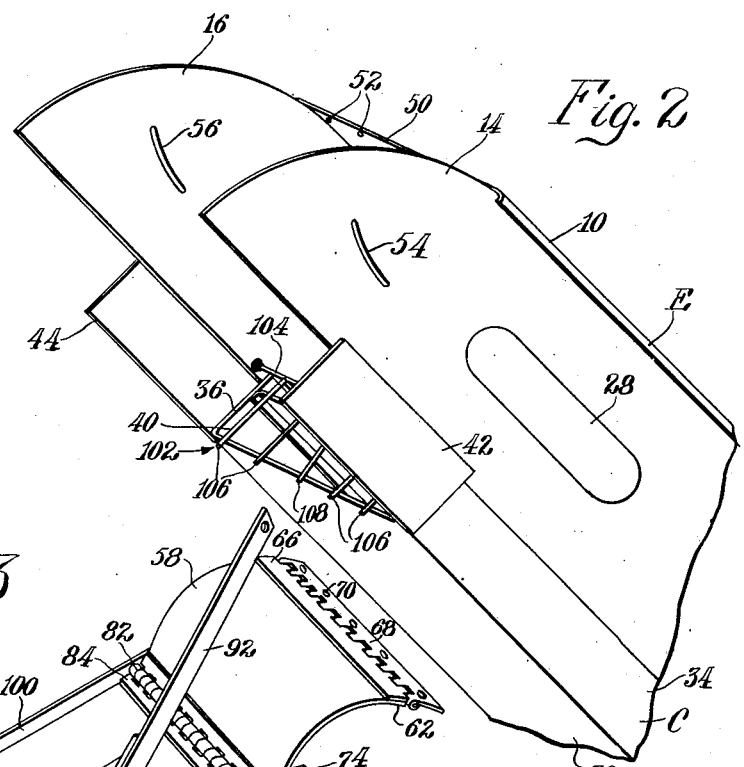
Figure 2 is an enlarged perspective view of the upper portion of the elevator or conveyor.
Figure 3:
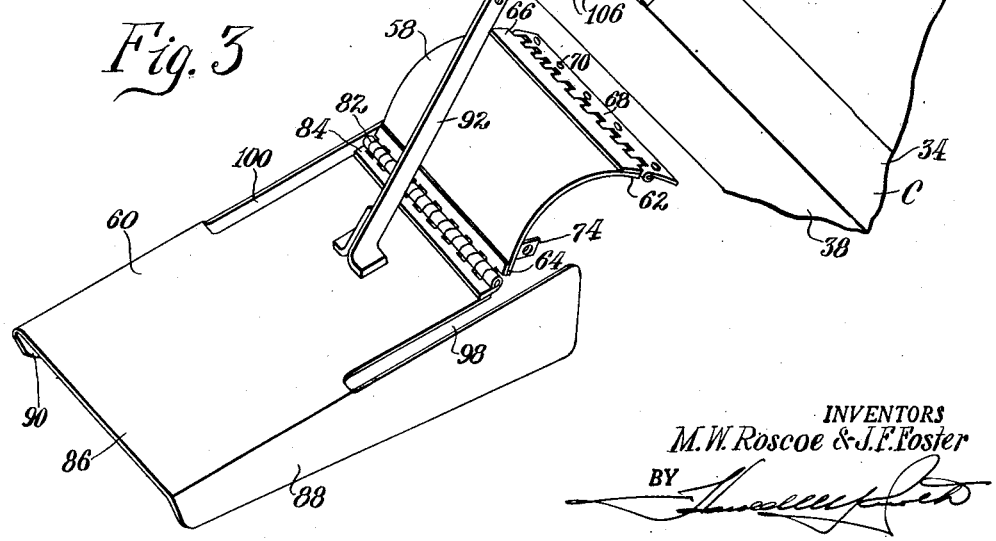
Figure 3 is a perspective view of the separating attachment.

The improved attachment means is shown by itself in Figure 3. Figure 2 shows the upper end of the elevator housing as constructed according to one commercial design. As stated above, it is an object of the invention to provide the attachment for association with elevator housings of the general type shown in Figure 2. In the preferred embodiment of the invention illustrated, certain modifications are made in the elevator housing to provide for the attachment of the structure shown in Figure 3. However, many variations may be indulged in and modifications of the elevator housing may not be required.

One of the modifications made in the elevator housing is the removal of an arcuate portion of the top wall that extends over the arcuately formed rear portions of the side walls 14 and 16. This leaves on the top wall 10 a terminal transverse rear edge 50. This edge may be provided with suitable openings, as suggested at 52, for the mounting of the attachment shown in Figure 3. The elevator housing is further modified by the provision in the side wall 14 of an arcuate slot 54. The slot 54 is arcuate about a center in the vicinity of the edge 50 of the top wall 10 of the housing. A similar arcuate slot 56 may be provided in the rear portion of the other side wall 16. The purpose of these slots, as well as the purpose of the openings 52 in the terminal edge 50 of the top wall 10, will presently appear.

The attachment as shown in Figure 3 comprises essentially only a few movable parts, among which are a baffle plate 58 and a deflector 60. The baffle plate is of generally rectangular shape and of arcuate configuration, having an upper terminal edge portion 62 and a lower terminal edge portion 64. The upper terminal edge portion has secured thereto hinge means 66 having a free leaf 68 provided with a plurality of apertures 70. The hinge may be secured to the baffle plate by any suitable means, preferably by welding.

The baffle plate is so dimensioned as to fit between the rear portions of the side walls 14 and 16 of the elevator E and the apertures 70 in the hinge leaf 68 register with the apertures 52 in the top wall terminal edge portion 50. Suitable securing means such as bolts 72 may be used to secure the deflector and baffle attachment in place. Such securing means may be found appropriate in the event of a field modification. However, if the attachment is provided at the factory, the hinge leaf 68 may be welded to the terminal edge portion 50. These details are unimportant.

When the attachment is mounted in place, the baffle plate 58 extends across between the rear portions of the side walls 14 and 16 and is transverse to the common initial path along which the conveyor belt 18 moves the indiscriminately intermingled ripe and green bolls. The arcuate shape of the baffle permits the inner surface of the baffle to be arranged in deflecting relationship to the lines of departure of the green bolls and ripe bolls from the conveyor belt 18. As shown in Figure 5, the baffle plate is disposed just rearwardly of the roller 20 of the conveyor means and is above the discharge outlet 32 provided by the termination of the conveyor housing bottom wall 12 short of the rear ends of the side walls 14 and 16.

Opposite side edges of the baffle plate 58 are provided respectively with apertured ears 74 and 76 (Figures 3 and 5) for receiving adjustable securing means 78 and 80 (Figure 4). These means cooperate with the arcuate slots 54 and 56 in the rear portions of the elevator housing side walls 14 and 16 and provide for fixing any selected position of adjustment of the baffle plate 58 about the transverse pivot axis provided by the hinge 66. This adjustment is important, because the discharge end of the conveyor 18 may be varied lengthwise relative to the discharge outlet 32 by adjustment of the roller shaft 24 lengthwise in the slots in the side walls 14 and 16 as previously described. It is therefore necessary to adjust the baffle plate 58 to accommodate the changes in position of the discharge portion of the conveyor.

The lower terminal edge portion 64 of the baffle plate 58 has a transverse hinge 82, one leaf 84 of which is suitably secured, as by welding, to the forward edge portion of the deflector 60. This deflector is in the form of a tunnel or inverted trough having an elongated top part 86 and right- and left-hand side parts 88 and 90. The deflector is, of course, articulated relative to the baffle plate 58 by means of the hinge 82. The top part has rigidly secured to a forward portion thereof an upstanding arm 92 having an apertured upper end to which a control rope 94 may be attached. As shown in Figure 1, the lower end of the rope may be connected to an adjustably positionable lever 96 so that the operator on the tractor may conveniently adjust the deflector 60 relative to the baffle plate 58.

Since the rear curved portion of the top wall 10 of the elevator housing E is cut out between the rear end portions of the side walls 14 and 16, the deflector may extend rearwardly between the side walls 14 and 16 as an angularly related extension of the baffle plate 58. Likewise, the removal of the top wall section just referred to enables the use of the particular arm 92 illustrated. Variations could of course be resorted to.

In the specific form of the invention illustrated, the side parts 88 and 90 of the deflector extend forwardly and respectively along the outside surfaces of the elevator housing side walls 14 and 16. Since the top part 86 of the deflector is between the side walls 14 and 16, the deflector is cut out at its sides to provide slots 98 and 100 at the junctions of the side parts 88 and 90 with the top part 86, thus accommodating the rear parts of the side walls 14 and 16 of the elevator housing. It is preferred to place the forward extensions of the deflector side parts outside the housing side walls in order to eliminate as many obstructions as possible to the free flow of cotton in a rearward direction.

Because of the parallel inclination of the elevator housing E and air conduit C, the air outlet 40 faces substantially in a rearward and upward direction, and it is not unlikely that some of the material delivered by the conveyor means 18 and dropping downwardly might find its way into the open end of the conduit. For this reason, there is provided a grille structure 102 (shown by itself in Figure 7) which is positioned across the air outlet 40. This grille structure comprises an elongated support or bar 104 from which depends a plurality of free-ended rods 106. In the present instance, there are five such rods and the outer pairs lie in a common plane passed through the principal axis of the elongated support 104. The central rod is offset from this plane so that its free end is spaced from the free ends of the other rods in a direction normal to the aforesaid plane. For the purposes of identity, the offset center rod is designated by the numeral 108.

When the grille structure is installed (Figure 5), the support 104 serves as a pivotal suspension means for suspending the grille between the housing side walls 14 and 16 so that it hangs across the air outlet 40. The offset center rod 108 engages the lower edge of the conduit C and spaces the other rods 106 outwardly from the air outlet 40. The transverse spacing of the rods 106 and 108 on the support 104 is such as to prevent the entry of bolls into the air outlet 40. It is not expected that ripe bolls will enter, since they will normally be blown away from the elevator in the direction R, but the heavier green bolls are apt to find their way at times into the conduit in the absence of a suitable protective grille.

The peculiar form of the grille structure has further importance in permitting the escape from the conduit of material taken into the pneumatic means ahead of the air outlet 40. As shown in Figure 1, the housing for the fan F is conventionally open at one side to provide an air intake 110. Of course, this opening and the coaxial opening conventionally provided at both sides of the fan housing could be screened, but the screens would soon clog with cotton. Therefore, it is expedient to leave the openings unscreened. At the same time, the openings do provide for entry of incidental cotton as the harvester advances over the field. Normally, this incidental cotton is harmless and will be delivered by the pneumatic means outwardly through the air outlet 40. Yet, if a permanently fixed grille structure were provided, this cotton would wrap around the grille bars and ultimately the air outlet would become clogged. The presently illustrated grille structure facilitates the escape of this incidental cotton, primarily because the offsetting of the center rod 108 permits the outward spacing of the free ends of the rods 106, so that any incidental cotton that tends to wrap around the rods 106 will slide off the free ends thereof. Only a minor portion of such incidental cotton will tend to adhere to the center rod 108 and this may be readily removed from time to time. The hinging of the grille structure is further important from the standpoint of permitting ready escape from the pneumatic means of foreign objects that may find their way into the conduit. It is not uncommon to find that green bolls will enter through the intake openings 110 in the fan housing and unless a movable grille were provided, considerable damage and annoyance would result.

The over-all results that are achieved by the use of the invention have been considered briefly in the description of Figure 1. The detailed operation will now be described, having reference primarily to Figure 5.

Since the roller 20 rotates in the direction of the arrow B, the upper run of the conveyor belt 18 will carry the indiscriminately intermingled ripe and green bolls along what may be termed a common initial path I. As the belt wraps around the roller, both types of bolls depart from the conveyor in the general zone 48. Because of the kinetic energy of the heavier green bolls GB, their departure will be accelerated over that of the ripe bolls RB and they will thus travel more rapidly and farther rearwardly than the ripe bolls. However, the baffle plate 58 retards the travel of the green bolls and the inner arcuate surface of the baffle plate presents a target against which the green bolls impinge to be directed downwardly as indicated by the heavy dotted line G. Of course, not all bolls will impinge at the same point but the dotted line is a general indication of what occurs. The ripe bolls may or may not impinge on the inner arcuate surface of the baffle plate 58, depending upon their condition of ripeness but if fully ripened it is expected that they will depart from the zone 48 more slowly and closer to the roller 20 than the green bolls GB, traveling somewhat in the arcuate path $R^2$. In the zone or area just to the rear of the roller 20, the ripe-boll path $R^2$ is parallel to or intermingled with the green-boll downward path so that it may be said that the two bolls are still intermingled in a downwardly moving stream. The green bolls, being heavier, will move downwardly without being substantially affected by the air blast A from the air outlet 40. However, the lighter ripe bolls will be materially affected by the air blast A and accordingly will depart from the common path at about the point $R^3$ to move rearwardly and upwardly as at $R^4$. The top part 86 of the deflector 60 overlies the ripe-boll path $R^4$ and the ripe bolls will be deflected by the undersurface of the deflector to travel ultimately in the final path or stream R for deposit in the wagon (Figure 1). The green bolls will drop straight downwardly to the pile $G^1$, which pile is separate from the pile $R^1$ of ripe bolls. The deflector is under the remote control of the operator via the lever 96, rope 94 and arm 92 for adjustment through a relatively wide range so that the pile R can be spread evenly over the rear two-thirds (approximately) of the box of the wagon W.

The attachment of the deflector 60 directly to the baffle plate 58 rather than to the rear end portions of the side walls 14 and 16 of the elevator housing as is conventional provides a material advantage, since it eliminates any space between the forward edge of the deflector and the lower terminal edge of the baffle plate. Such space will enable the creation of air turbulence which will interfere to a considerable extent with the proper separation of the ripe bolls from the green bolls. The direct hinging of the deflector 60 to the baffle plate 58 is not only important in the respect noted but enables the use of a simple and economical construction that may, as previously stated, be provided either as a field-conversion attachment or as a factory-installed component.

Various other features and advantages of the invention not specifically enumerated herein will undoubtedly occur to those versed in the art, as likewise will numerous modifications and alterations in the preferred embodiment of the invention illustrated, all of which may be achieved

What is claimed is:

1. Cotton-ball-separating apparatus, comprising: conveyor means for moving indiscriminately intermingled relatively heavy green bolls and relatively lighter ripe bolls simultaneously along an initial path at a substantial angle to the vertical, said conveyor means having a discharge portion beyond which both green and ripe bolls are trajected substantially simultaneously outwardly generally in prolongation of said initial path and with the ripe bolls falling relatively quickly from a relatively low and short trajectory and the green bolls, because of their greater kinetic energy, being accelerated and thereby tending to travel in a relatively longer and higher trajectory; pneumatic means having an air outlet positioned immediately below the discharge portion of the conveyor means for directing a blast of air below and in the same general direction as the trajectories of the green and ripe bolls; a baffle plate positioned immediately beyond the discharge portion of the conveyor means and transverse to said initial path, said plate having an upper portion at a level above the initial path and extending from said upper portion outwardly over said trajectories and thence downwardly in obstructing relationship to the green boll trajectory to intercept trajected green bolls and to deflect such green bolls downwardly substantially in parallel with the falling ripe bolls so that both ripe and green bolls descend substantially simultaneously into the air blast; means mounting the baffle plate for selective adjustment toward and away from the discharge portion of the conveyor means, said baffle plate having a lower terminal edge portion disposed at a level above the air outlet and said air blast being of such intensity as to permit the falling green bolls to continue their descent while causing the falling ripe bolls to be blown beneath and outwardly beyond the lower edge portion of the baffle plate; a deflector plate having a mounting portion hinged on a transverse horizontal axis to the lower edge portion of the baffle plate and extending outwardly from said lower edge portion and having its undersurface overlying the path of the blown ripe bolls; and means for fixing a selected adjusted position of the deflector relative to the baffle plate about the aforesaid hinge axis for varying the deflecting relationship of said undersurface of the deflector plate to said blown ripe bolls.

2. A baffle and deflector attachment for an uphill conveyor housing having side walls and top and bottom walls leading to an upper discharge end and containing conveyor means for moving indiscriminately intermingled green cotton bolls and ripe cotton bolls in an initial path toward the discharge end of the housing so that both types of bolls are trajected from a terminal discharge portion of the conveyor means to drop through an uphill air blast closely below the discharge end of the housing and delivered by an air conduit having side walls depending respectively from the housing side walls, said attachment comprising: a baffle plate positionable at the discharge end of the housing and beyond the terminal discharge portion of the conveyor means and transversely dimensioned to fit between the inner surfaces of the side walls and to extend across the side walls transverse to the initial path in obstructing relationship to the trajected bolls and having an upper edge portion and a lower edge portion, said upper edge portion being positionable proximate to the housing top wall and the lower edge portion being spaced below said upper edge portion so as to lie at a level above the air outlet, said lower edge portion being further offset from said upper edge portion in the direction of trajection of the bolls so that the baffle plate presents an outwardly and downwardly directed inner surface to the trajected bolls; means on the baffle plate for mounting it in the housing with its upper edge portion adjoining the undersurface of the housing top wall just above the discharge portion of the conveyor means; a deflector having opposite ends and hinged at one end to the lower edge of the baffle plate to extend away from said edge in the direction of and over the air blast; and means on the deflector for adjusting the deflector relative to the baffle plate about said hinge means.

3. Material-separating apparatus comprising: an elongated uphill conveyor housing having a downwardly directed material-discharge outlet at its upper end; conveyor means in the housing for moving material uphill for discharge downwardly through said outlet; pneumatic means having an air intake opening adjacent to a lower portion of the housing and including a conduit having a terminal end providing an air outlet facing uphill below and adjacent to the material-discharge outlet for directing an air blast across material moving downwardly through said material-discharge outlet; grille structure positioned over the air outlet to prevent downwardly moving material from entering said air outlet; and means suspending the grille structure over the air outlet for swinging in the direction of the air blast to permit the escape through the air outlet of material or other objects taken into the pneumatic means via said air intake.

4. The invention defined in claim 3, in which: the grille structure includes free-ended rods extending downwardly from the ssupension means and across the air outlet so that loose cotton transmitted through the air outlet by the pneumatic means and wrapping on the rods may escape off the free ends of the rods.

5. The invention defined in claim 4, in which: means is provided for spacing certain of the free ends of the rods outwardly from the terminal end of the conduit to facilitate the escape of such loose cotton.

6. The invention defined in claim 4, in which: certain of the rods are coplanar in a plane crosswise of the air outlet and certain of the rods are offset from said plane toward the air outlet to engage the conduit for spacing the free ends of the coplanar rods outwardly from the lower edge portion of the conduit.

7. The invention defined in claim 2, in which: the deflector is in the form of an inverted trough having an elongated top part from opposite sides of which vertical side parts depend, and the junction between the deflector top part and each of its side parts includes a slot parallel to the associated side part.

References Cited in the file of this patent

UNITED STATES PATENTS

| | | |
|---|---|---|
| 373,077 | Larrabee | Nov. 15, 1887 |
| 531,722 | Hart | Jan. 1, 1895 |
| 891,012 | Shepard | June 16, 1908 |
| 1,222,003 | Lannin | Apr. 10, 1917 |
| 1,493,292 | Sweeney | May 6, 1924 |
| 1,631,446 | Worthington | June 7, 1927 |
| 1,679,280 | Towns | July 31, 1928 |
| 1,688,206 | Rosholt | Oct. 16, 1928 |
| 2,257,097 | Anderson | Sept. 30, 1941 |
| 2,699,867 | Kitten et al. | Jan. 18, 1955 |